(12) United States Patent
Jordá Beneyto et al.

(10) Patent No.: US 11,111,379 B2
(45) Date of Patent: Sep. 7, 2021

(54) POLYMER NANOCOMPOSITE COMPRISING POLY(ETHYLENE TEREPHTHALATE) REINFORCED WITH AN INTERCALATED PHYLLOSILICATE

(71) Applicant: INSTITUTO TECNOLÓGICO DEL EMBALAJE, TRANSPORTE Y LOGÍSTICA (ITENE), Paterna (ES)

(72) Inventors: María Jordá Beneyto, Paterna (ES); Natalia Ortuño Mansilla, Paterna (ES); Maria Del Carmen Sánchez Reig, Paterna (ES); Miriam Gallur Blanca, Paterna (ES); Susana Aucejo Romero, Paterna (ES); Javier Zabaleta Meri, Paterna (ES)

(73) Assignee: INSTITUTO TECNOLÓGICO DEL EMBALAJE TRANSPORTE Y LOGÍSTICA (ITENE), Paterna (ES)

( * ) Notice: Subject to any disclaimer, the term of this patent is extended or adjusted under 35 U.S.C. 154(b) by 78 days.

(21) Appl. No.: 16/331,471

(22) PCT Filed: Sep. 14, 2017

(86) PCT No.: PCT/EP2017/073183
§ 371 (c)(1),
(2) Date: Mar. 7, 2019

(87) PCT Pub. No.: WO2018/050770
PCT Pub. Date: Mar. 22, 2018

(65) Prior Publication Data
US 2019/0218390 A1    Jul. 18, 2019

(30) Foreign Application Priority Data

Sep. 15, 2016 (EP) .................... 16382430

(51) Int. Cl.

| | | |
|---|---|---|
| C08L 67/02 | (2006.01) |
| C08K 3/34 | (2006.01) |
| C08K 9/08 | (2006.01) |
| C08J 5/00 | (2006.01) |
| B29C 49/00 | (2006.01) |
| C08G 63/16 | (2006.01) |
| C08G 63/181 | (2006.01) |
| C08J 3/22 | (2006.01) |
| C08K 5/19 | (2006.01) |
| C08K 13/02 | (2006.01) |
| B82Y 30/00 | (2011.01) |
| B29C 49/06 | (2006.01) |
| B29K 67/00 | (2006.01) |
| B29K 105/16 | (2006.01) |
| B29K 509/00 | (2006.01) |
| B29L 31/00 | (2006.01) |

(52) U.S. Cl.
CPC .......... *C08L 67/02* (2013.01); *B29C 49/0005* (2013.01); *C08G 63/16* (2013.01); *C08G 63/181* (2013.01); *C08J 3/226* (2013.01); *C08J 5/005* (2013.01); *C08K 3/346* (2013.01); *C08K 5/19* (2013.01); *C08K 9/08* (2013.01); *C08K 13/02* (2013.01); *B29C 49/06* (2013.01); *B29K 2067/003* (2013.01); *B29K 2105/162* (2013.01); *B29K 2509/00* (2013.01); *B29L 2031/7158* (2013.01); *B82Y 30/00* (2013.01); *C08J 2367/02* (2013.01); *C08K 2201/008* (2013.01); *C08K 2201/011* (2013.01); *C08L 2201/14* (2013.01); *C08L 2203/10* (2013.01); *C08L 2205/025* (2013.01); *C08L 2310/00* (2013.01)

(58) Field of Classification Search
CPC ....... C08L 67/02; C08L 2203/10; C08K 9/08; C08K 3/346; C08K 13/02; C08K 2201/11; C08K 2203/10; C08G 63/16; C08G 63/181; C08J 3/226; C08J 2367/02
See application file for complete search history.

(56) References Cited

U.S. PATENT DOCUMENTS

| | | | |
|---|---|---|---|
| 2006/0122309 A1 | 6/2006 | Grah et al. | |
| 2012/0245280 A1* | 9/2012 | Tsudo ................ | C08G 18/4018 524/590 |
| 2016/0319124 A1* | 11/2016 | Bongiovanni ......... | C08K 3/013 |

FOREIGN PATENT DOCUMENTS

| | | |
|---|---|---|
| CN | 1465621 A | 1/2004 |
| EP | 1787918 A1 | 5/2007 |
| WO | WO 2005/030850 A1 | 4/2005 |
| WO | WO 2012/017026 A1 | 2/2012 |

OTHER PUBLICATIONS

Merriam-Webster's Collegiate Dictionary, 11th Ed., 2004, p. 934.*

(Continued)

*Primary Examiner* — Robert S Jones, Jr.
(74) *Attorney, Agent, or Firm* — Sguire Patton Boggs (US) LLP

(57) ABSTRACT

It is provided a phyllosilicate having a layered structure in the form of platelets and comprising an intercalating agent between the platelets, wherein the intercalating agent is a polyester of a molecular weight of 274 to 30,000 g/mol, and wherein the phyllosilicate is other than a phyllosilicate modified through ionic interchange. It is also provides a polymer nanocomposite comprising a polyethylene terephthalate (PET) polymer an the phyllosilicate mentioned above, as well as preparation processes for the preparation of the intercalated phyllosilicate and the PET nanocomposite. The PET nanocomposite is particularly useful for packaging, particularly for food and drink packaging.

20 Claims, 1 Drawing Sheet

(56) References Cited

OTHER PUBLICATIONS

Whelan, T.; Polymer Technology Dictionary, 1st Ed., 1994, p. 304.*
International Search Report and Written Opinion dated Dec. 1, 2017 for PCT Application No. PCT/EP2017/073183, 11 pages.
International Preliminary Report on Patentability dated Aug. 2, 2018 for PCT/EP2017/073183, 6 pages.
"Method of Test for Weight change and compatibility of packaged products", The Plastic Bottle PBI 5 1968 (rev. 2-1990), 6 pages.
"Standard Test Method for Oxygen Gas Transmission Rate Through Plastic Film and Sheeting using a Coulometric Sensor", ASTM D3985-05 (reapproved 2010), 7 pages.

* cited by examiner

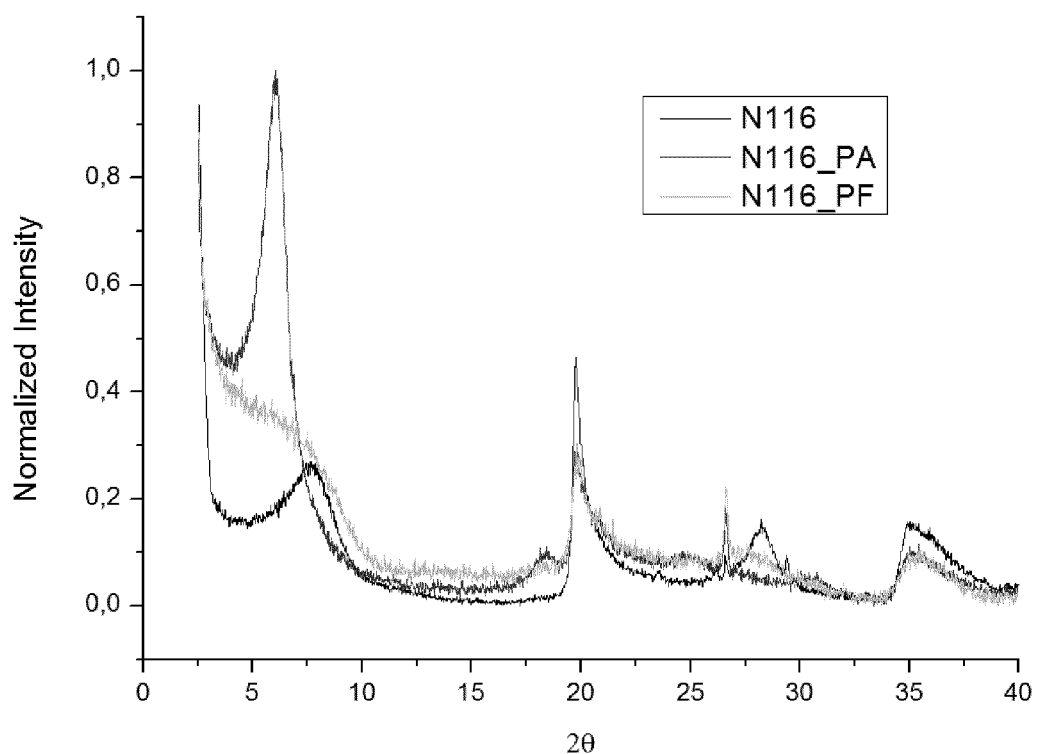

POLYMER NANOCOMPOSITE COMPRISING POLY(ETHYLENE TEREPHTHALATE) REINFORCED WITH AN INTERCALATED PHYLLOSILICATE

This application claims the benefit of European Patent Application EP16382430.3 filed on Sep. 15, 2016.

TECHNICAL FIELD

The present invention relates to an intercalated phyllosilicate not modified through ionic exchange reactions, a process for its preparation, a polymer nanocomposite containing the intercalated phyllosilicate, and to the use of the polymer nanocomposite for packaging, particularly for food packaging.

BACKGROUND ART

Polyethylene terephthalate (PET) has found several packaging applications due in part to its high transparency and good mechanical and barrier properties. This has given rise to the production of large quantities of PET for the application to the packaging material industry. Since PET is a stable and non-biodegradable material it has been a challenge to reduce the environmental impacts of PET based products. Therefore, finding new methods to lower the economic and environmental impacts of such materials is highly desirable.

The development of nanoparticles as nanofillers to reinforce polymer composites is a method that allows improving mechanical and barrier properties, making it possible to reduce weight in polymeric packaging materials and consequently the economic and environmental impact. Fillers having a layered structure like phyllosilicates, have been the most studied as they offer improvements in mechanical and barrier properties (EP1787918A1, US2016024283).

EP1787918A1 describes a biodegradable polyester resin reinforced by a phyllosilicate. The phyllosilicate is substituted with ammonium, pyridinium, imidazolium, or phosphonium ions. Examples of ammonium ions include tetraethylammonium, octadecyltrimethylammonium, and dimethyldioctadecylammonium, among others. The resin has improved barrier properties but no consideration is given regarding improvements in the mechanical properties such as the elongation at break.

US2016024283A1 discloses PET nanocomposite materials that exhibit improved physical properties in a PET as a result of the intercalation of non smectite-type clay materials while maintaining transparency and barrier properties. In this paper, no improvement in barrier properties is achieved.

WO2005030850A1 describes the formation of intercalated sodium motmorillonite using an oligoPET. This intercalate is added to PET to result in a nanocomposite which allegedly can be extruded to obtain films, bottles, etc. Nevertheless, in the reproduction of Example 1 shown in comparative Example 8 and in Example 7 of the present application, the obtained nanocomposite is highly brittle and has unfavourable thermal properties, what makes it unable for their use in the manufacture of some articles such as bottles.

Numerous studies have focused on the barrier and mechanical performances of nanoclay-PET composites, however very little improvements have been reported. Additionally, modifiers commonly used to improve the dispersion of phyllosilicate clays on polymeric materials are either not suitable for food contact or not thermally stable at the processing temperature of PET. Decomposition of these modifiers may lead to the degradation of polymer matrix and inversely affect the mechanical and barrier properties of the composite, leading even to a non-processable material due to the decrease in viscosity of the melt compound.

To overcome the abovementioned problems, the present invention is directed to new thermally stable clays which are ready to be used as nanofillers to result in PET nanocomposites with improved mechanical and barrier properties.

SUMMARY OF THE INVENTION

Inventors have found that by intercalating a polyester of a molecular weight of 274 to 30,000 g/mol, particularly either polyadipate or polyphthalate in a raw phyllosilicate, it is produced an intercalated phyllosilicate which is more stable at high temperatures than phyllosilicates modified through ionic exchange reactions, such as modified with hexadecyltrimethyl ammonium cations. Thus, the intercalated phyllosilicate of the invention can be processed at higher temperatures without undergoing degradation, which is an advantage when used to improve properties of polymers with high melting points such as PET.

Therefore, a first aspect of the invention relates to a phyllosilicate having a layered structure in the form of platelets and having an intercalating agent between the platelets, wherein the intercalating agent is a polyester of a molecular weight of 274 to 30,000 g/mol, or of 1,000 to 20,000 g/mol, or of 1,500 to 20,000 g/mol, or of 2,500 to 20,000 g/mol, or of 1,500 to 12,000 g/mol, or of 2,500 to 12,000 g/mol, or of 1,000 to 5,000 g/mol, or of 1,500 to 2,500 g/mol, wherein the phyllosilicate is other than a phyllosilicate modified through ionic exchange reactions.

Additionally, inventors have found that the incorporation into a polyethylene terephthalate (PET) polymer of a phyllosilicate intercalated with polyadipate or with polyphthalate results in a PET nanocomposite showing not only improved mechanical properties but also enhanced barrier properties, maintaining thermal degradation resistance.

Accordingly, another aspect of the invention relates to a polymer nanocomposite comprising a polyethylene terephthalate (PET) polymer and an intercalated phyllosilicate as defined above.

The fact that the polymer nanocomposite of the present invention shows excellent barrier properties is advantageous for its use for storage of aqueous drinks (e.g. water, juice, milk) since the loss of water vapour through the wall of the bottles is minimized, and particularly of soft drinks in order to preserve $CO_2$ levels inside the packaging. Good barrier properties are also advantageous in food packaging. Food containers must present a good barrier property against the diffusion of oxygen and water vapours in order to keep the food in good conditions for the intended shelf life. Therefore, the improvement in barrier properties, may lead to an extension of the food product shelf life. In addition, the polymer nanocomposite of the present invention shows excellent mechanical strength and less rigidity which is an advantage for long term storage packaging, avoiding the polymer nanocomposite deformation and cracking. Nothing in the art suggests that a phyllosilicate intercalated with a polyester as defined above, particularly with polyadipate or polyphthalate, could confer to PET excellent mechanical and barrier properties.

Another aspect of the invention relates to a process for the preparation of the intercalated phyllosilicate as defined above, the process comprising:

i) dispersing the phyllosilicate in a solvent selected from water and a mixture of water and a $C_1$-$C_{10}$ alcohol under stirring;

ii) optionally, submitting the dispersion to ultrasonic treatment;

iii) mixing the dispersion with an intercalating agent which is a polyester as defined above, particularly an intercalating agent selected from polyadipate, polyphthalate, and a mixture thereof, optionally dissolved in a mixture of water and a $C_1$-$C_{10}$ alcohol;

iv) keeping the mixture of step iii) under continuous stirring for 17 to 24 hours at a temperature from 60° C. to 75° C.; and v) isolating the compound obtained in step (iv).

Thus, the invention also relates to the intercalated phyllosilicate obtainable by the process above.

Another aspect of the invention relates to a process for the preparation of a PET nanocomposite as defined above, the process comprising melt-blending PET and the intercalated phyllosilicate as defined above.

Another aspect of the present invention relates to the use of a phyllosilicate intercalated with a polyester as defined above, particularly with either polyadipate or polyphthalate, as a reinforcing agent of PET.

Another aspect of the invention relates to a process for the preparation of an article of manufacture made of the PET nanocomposite as defined above, the process comprising:

a) dispersing the phyllosilicate in an intercalating agent;

b) mixing the dispersion obtained in step a) with PET; and c) obtaining an article of manufacture by extrusion, injection or injection stretch blow moulding of the mixture obtained in step b), wherein the intercalating agent is a polyester of a molecular weight of 274 to 30,000 g/mol, or of 1,000 to 20,000 g/mol, or of 1,500 to 20,000 g/mol, or of 2,500 to 20,000 g/mol, or of 1,500 to 12,000 g/mol, or of 2,500 to 12,000 g/mol, or of 1,000 to 5,000 g/mol, or of 1,500 to 2,500 g/mol, and wherein the phyllosilicate is not modified through ionic exchange reactions.

The invention also relates to the PET nanocomposite obtainable by any one of the processes mentioned above.

The invention also concerns any article of manufacture made of the PET nanocomposite of the invention. The article can be manufactured by methods known in the art, such as by extrusion. The improved mechanical and barrier properties of the PET nanocomposite make it especially useful for its use as container, bag or film. Therefore, another aspect of the present invention relates to a bottle, container, bag or film made of the PET nanocomposite as defined above.

BREVE DESCRIPCIÓN DE LOS DIBUJOS/BRIEF DESCRIPTION OF THE DRAWINGS

FIG. 1 shows the X Ray diffraction pattern of phyllosilicate (purified sodium montmorillonite, Nanofil116® from BYK Additives) with an intercalating agent (PA or PF).

DETAILED DESCRIPTION OF THE INVENTION

As used herein, the term "PET nanocomposite", refers to a PET material which contains a nanoscale material in the form of nanoparticles incorporated therein. "Nanoparticles" relate to particles having at least one dimension in the nanometer size range, such as in the 0.1 to 100 nm range. In the case of the present invention the nanoscale material is the intercalated phyllosilicate of the invention which lamellae thickness is around 1-2 nm.

As used herein, the term "phyllosilicates", refers to layered silicates, namely a silicate having a structure of layers, particularly natural calcium or sodium clays. More particularly, it refers to layered silicates in which the $SiO_4$ tetrahedral are linked together in two dimensional sheets and are condensed with layers of $AlO_6$ or MgO octahedral in the ratio 2:1 or 1:1. The negatively charged layers attract positive cations (e.g. $Na^+$, $K^+$, $Ca^{2+}$, $Mg^{2+}$) which can hold the layers together. Non limiting examples phyllosilicate which may be used within the scope of the present invention are sepiolite, halloysite, bentonite, kaolinite, wollastonite, mica, sodium montmorillonite, magnesium montmorillonite, calcium montmorillonite. In a particular embodiment, the phyllosilicate is sodium montmorillonite.

As used herein, the term "phyllosilicate not modified through ionic exchange reaction", refers to phyllosilicates wherein their positive cations (e.g. $Na^+$, $K^+$, $Ca^{2+}$, $Mg^{2+}$) are not exchanged by alkylammonium cations as modifying agents.

As used herein, the term "intercalated" and variations of the word refers to an arrangement of the layered phyllosilicate wherein a material, called intercalating agent, is inserted into the phyllosilicate platelets increasing the interlayer spacing without completely separating the platelets. As used herein, the term "intercalating agent" refers to a material that is disposed between platelets of layered phyllosilicate for increasing the interlayer spacing.

As used herein, the term "polyester" refers to a polymer that contain the ester functional group in their main chain. Examples of polyesters useful for the aim of the present invention are polyadipates, and polyphthalates.

As used herein, the term "molecular weight" refers to the average molecular weight, which is the common molecular weight measure used in this kind of polymers.

It is noted that, as used herein and in the appended claims, the singular forms "a", "an", and "the" include plural referents unless the context clearly dictates otherwise.

As mentioned above, a first aspect of the invention relates a phyllosilicate intercalated with a polyester of a molecular weight of 274 to 30,000 g/mol, or of 1,000 to 20,000 g/mol, or of 1,500 to 20,000 g/mol, or of 2,500 to 20,000 g/mol, or of 1,500 to 12,000 g/mol, or of 2,500 to 12,000 g/mol, or of 1,000 to 5,000 g/mol, or of 1,500 to 2,500 g/mol, wherein the phyllosilicate is not modified through ionic interchange.

In a particular embodiment of the intercalated phyllosilicate of the invention, the weight ratio of intercalating agent to phyllosilicate is 5:95 to 60:40, particularly 10:90 to 40:60, more particularly 15:85 to 20:80. In another particular embodiment, optionally in combination with one or more features of the particular embodiments defined above, the space between the adjacent platelets of the phyllosilicate is expanded to at least 3 Å, particularly from 3 to 14.52 Å.

In a particular embodiment of the intercalated phyllosilicate of the invention, optionally in combination with one or more features of the particular embodiments defined above, the polyester is selected from polyadipate, polyphthalate, or a mixture thereof.

In another particular embodiment of the intercalated phyllosilicate of the invention, optionally in combination with one or more features of the particular embodiments defined above, the polyester is polyadipate.

In another particular embodiment of the intercalated phyllosilicate of the invention, optionally in combination with one or more features of the particular embodiments defined above, the polyester is polyphthalate.

In another particular embodiment, optionally in combination with one or more features of the particular embodiments defined above, the polyadipate or the polyphthalate has a molecular weight of 1,000 to 5,000 g/mol, particularly of 1,500 to 2,500 g/mol.

A polyadipate is a polyester of adipic acid, one or more diols, and optionally, one or more monohydric alcohols. A polyphthalate is a polyester of phthalic acid, one or more diols, and optionally, one or more monohydric alcohols.

Particularly, the diol is a lineal or branched (when possible) $C_2$-$C_{14}$ diol, more particularly, $C_3$-$C_{10}$ diol. Particular examples of suitable diols include, without being limited to, ethylene glycol, 1,2-propanediol, 2-methyl-1,3-propanediol, 1,3-butanediol, 1,4-butanediol, 1,2-pentanediol, 1,4-pentanediol, 1,5-pentanediol, 2,4-pentanediol, 3-methyl-1,5-pentanediol, 1,6-hexanediol, 1,2-hexanediol, 1,5-hexanediol, 2,5-hexanediol, and mixtures thereof. Also particularly, the monohydric alcohol is a lineal or branched (when possible) $C_1$-$C_{14}$ alcohol, more particularly, $C_3$-$C_{10}$ alcohol. Particular examples of suitable monohydric alcohols include 1-propanol, 2-propanol, 1-butanol, 2-butanol, 3-methyl-1-butanol, 1-pentanol, 2-pentanol, 3-pentanol, 2-methyl-1-pentanol, 2,3-dimethyl-1-pentanol, 2-ethyl-1-hexanol, and mixtures thereof. Particularly, the polyadipate is the polyester of adipic acid with 1,3-butanediol, 1,2-propanediol and 2-ethyl-1-hexanol. Also particularly, the polyphthalate is poly(ethylen glycol phthalate).

In another particular embodiment of the intercalated phyllosilicate of the invention, optionally in combination with one or more features of the particular embodiments defined above, the phyllosilicate is selected from the group consisting of a montmorillonite, sepiolite, halloysite, bentonite, kaolinite, wollastonite and mica. Particularly, the phyllosilicate is selected from the group consisting of sodium montmorillonite, magnesium montmorillonite, and calcium montmorillonite. More particularly, the phyllosilicate is sodium montmorillonite.

For the preparation of the intercalated phyllosilicates of the invention, a suspension of the phyllosilicate on a suitable solvent is mixed with a solution of the intercalating agent in a suitable solvent. Particularly, previously to the admixture, the phyllosilicate dispersion is submitted to a vigorous stirring and, optionally, to an ultrasound treatment.

Examples of suitable solvents include, without being limited to, water, a $C_1$-$C_{10}$ alcohol, and mixtures thereof. The $C_1$-$C_{10}$ alcohol can be any monohydric alcohol containing from 1 to 10 carbon atoms or mixtures thereof. Particularly, the alcohol is a $C_1$-$C_4$ alcohol. Suitable $C_1$-$C_4$ alcohols include methanol, ethanol, isopropyl alcohol, isobutyl alcohol, n-butyl alcohol, sec-butyl alcohol, tert-butyl alcohol, and the like. In a particular embodiment of the process for the preparation of the intercalated phyllosilicate of the invention, the solvent is a mixture of water and ethanol.

Thus, as commented above, the process for the preparation of the intercalated phyllosilicate comprises:
i) dispersing the phyllosilicate in a solvent selected from water and a mixture of water and a $C_1$-$C_{10}$ alcohol under stirring,
ii) optionally, submitting the dispersion to ultrasonic treatment;
iii) mixing the dispersion with an intercalating agent which is a polyester as defined above, particularly an intercalating agent selected from polyadipate, polyphthalate, and a mixture thereof, optionally dissolved in a mixture of water and a $C_1$-$C_{10}$ alcohol;
iv) keeping the mixture of step iii) under continuous stirring for 17 to 24 hours at a temperature from 60° C. to 75° C.; and
v) isolating the compound obtained in step (iv).

In a particular embodiment, vigorous stirring in step i) is carried out at a speed from 600 to 3000 rpm, particularly for 90 to 150 minutes. In a more particular embodiment vigorous stirring in step i) is carried out at 900 rpm and 70° C. for 120 minutes.

The intensity of the sound waves, as well as their frequency, of the ultrasonic treatment can be adjusted to the nature of the starting components used, which can be easily determined from case to case by preliminary tests. In a particular embodiment, optionally in combination with one or more features of the particular embodiments defined above, the frequency of the ultrasonic waves is from 20 to 35 kHz. Particularly, the ultrasound treatment is carried out for 15 to 30 minutes. Also particularly, the ultrasonic treatment is carried out at a temperature from 40 to 50° C.

In another particular embodiment of the process for the preparation of the intercalated phyllosilicate, optionally in combination with one or more features of the particular embodiments defined above, stirring in step iv) is carried out at a speed from 600 to 3000 rpm.

In another particular embodiment, optionally in combination with one or more features of the particular embodiments defined above, the isolating step comprises purifying of the obtained intercalated phyllosilicate. Particularly, the intercalated phyllosilicate is purified by filtering the suspension obtained in step iv), washing the isolated solid, namely the intercalated phyllosilicate, by adding a water:ethanol solution thereto, and maintaining the mixture under stirring at a temperature from 50° C. to 70° C. in order to remove the excess of non-intercalated polyester, particularly of non-intercalated polyadipate (PA) or polyphthalate (PF). The suspension is filtered and the obtained purified intercalated phyllosilicate is finally dried.

The drying step can be carried out at a temperature from 70° C. to 90° C. It can be carried out in a conventional oven, by lyophilisation, by atomization or spray-drying. Generally, the drying process can take from about 15 to about 20 hours, particularly about 17 hours. After the drying step, the intercalated phyllosilicate can be subsequently milled and sieved in order to obtain a particulate solid with the desired particle size distribution. Generally, it is milled and sieved to obtain a product with a particle size below 63 microns, more particularly below 45 microns.

The invention also relates to the intercalated phyllosilicate obtainable by any of the particular and/or preferred embodiments of the process disclosed above or combinations thereof.

As mentioned above, another aspect of the invention relates to polymer nanocomposite comprising a polyethylene terephthalate (PET) polymer and an intercalated phyllosilicate as defined above.

In another particular of the PET nanocomposite of the invention, optionally in combination with one or more features of the particular embodiments defined above, the weight-to-weight ratio of intercalated phyllosilicate to PET polymer is from 0.2:99.8 to 20:80, particularly from 1:99 to 18:82, and more particularly from 2:98 to 16:84.

In another particular of the PET nanocomposite of the invention, optionally in combination with one or more features of the particular embodiments defined above, the intercalating agent is selected from polyadipate, polyphthalate, or a mixture thereof.

In another particular embodiment of the intercalated phyllosilicate of the invention, optionally in combination with one or more features of the particular embodiments defined above, the intercalating agent is polyadipate.

In another particular embodiment of the intercalated phyllosilicate of the invention, optionally in combination with one or more features of the particular embodiments defined above, the intercalating agent is polyphthalate.

In order to adjust the properties of the final product, the PET nanocomposite of the invention can comprise further additives such as pigments, heat stabilizers, antioxidants, water resistant agents, flame retardants, terminal blocking agents, plasticizers, lubricants, mold release agents, antistatic agents, fluorescent brightening agents, processing aids, chain extenders, impact modifiers, UV stabilizers, antifog agents, and fillers.

Examples of antistatic agents include ethoxylated fatty ester. Examples of plasticisers include citrate esters, glycols and polyglycols. Examples of antioxidants include phenol, phosphates and tocopherol. Examples of processing aids include acrylic polymers. Examples of the chain extenders include acrylic copolymers. Examples of impact modifiers include ethylene, acrylic copolymers and polymers. Examples of UV stabilizers include benzotriazol, benzophenones and piperidine derivatives. Examples of the antifog agents include ethoxylated fatty ester.

As mentioned above, the corresponding nanocomposite can be obtained by melt-blending a PET polymer and the intercalated phyllosilicate as defined above. The addition of components intercalated phyllosilicate can be carried out in all customary mixing machines in which the polymer is melted and mixed with the additives. Suitable machines are known to those skilled in the art. They are predominantly mixers, kneaders and extruders. The process is preferably carried out in an extruder by introducing the additive during processing. Particularly preferred processing machines are single-screw extruders, contra-rotating and co-rotating twin-screw extruders, planetary-gear extruders, ring extruders or co-kneaders. More particularly preferred, co-rotating twin screw extruders are preferred. Suitable extruders have a screw length is 1-60 screw diameters, preferably 35-48 screw diameters. The rotational speed of the screw is preferably 10 to 600 rotations per minute (rpm), for example 25-300 rpm. The maximum throughput is dependent on the screw diameter, the rotational speed and the driving force.

In a particular embodiment, melt-blending is carried out at a temperature from 230° C. to 280° C., particularly at 260° C.

Alternatively, as commented above, instead of first producing a PET-intercalated phyllosilicate nanocomposite as a raw material for the preparation of the final package, according to another aspect of the process of the invention for the preparation of an article of manufacture made of the PET nanocomposite as defined above, the phyllosilicate can be first dispersed in the intercalating agent such as PA or PF (step a) and the mixture can be directly admixed with the PET (step b) on the process for the preparation of the final article of manufacture.

In a particular embodiment of this aspect of the invention, step b), namely the mixing of the dispersion obtained in step a) with PET, can be carried out through melt mixing by a compounding step.

In another particular embodiment, step b) can be carried out by using a melt pump to feed directly the dispersion on an equipment used to perform step c).

The mixing process can be carried out by extrusion, injection or injection stretch blow moulding. Thus, a metering system for introducing the phyllosilicate dispersed in the intercalating agents into the main stream polymer is required. For a liquid component, the metering device may be a system comprising one or more metering pumps which introduce the liquid at the main inlet of, for instance, an extruder jointly with the feed with the main polymer granules, without any pressure, or at a point under pressure located along the extruder.

Colour concentrates or liquid colorants can be incorporated into the resin preforms at let-down ratio from 1 to 3%, and in some special cases, up to 8%. In such production systems, the liquid colorant is fed into the throat of the injection moulding press using a liquid colour pump that is calibrated to deliver at the desired let-down ratio. The liquid dispersion of (the) intercalated phyllosilicate, can be injected into the feed throat of injection, extrusion or blow moulding machines using peristaltic metering pumps, allowing direct feeding during operations. This can reduce formulation changeover times, and eliminating the need to empty resin in the hopper. The liquid dispersion is adhered to the surface of granulates and is conveyed through the screw, molten leading to its incorporation in the polymeric matrix and injected into a preform.

The invention also relates to PET nanocomposite obtainable by any of the particular and/or preferred embodiments of the process disclosed above or combinations thereof.

As mentioned above, the invention also concerns any article of manufacture made of the PET nanocomposite of the invention. Particularly, the present invention provides pre-forms and bottles made of the PET nanocomposite of the invention. Particularly, these articles can be produced by injection-stretch-blow-moulding (ISBM). Injection-stretch-blow-moulding can be carried out either in a two-machine process or in a single machine process. In the single-machine process, all the steps are carried out in the same machine. The cooling step, the transporting step and the reheating step are thus replaced by a single conditioning step that consists in slightly re-heating the pre-form following the temperature profile required for the stretching step. A two-machine process is generally preferred and it is carried out in two separate locations. It comprises the steps of:
i) preparation of a pre-form, comprising:
    providing a pre-form by injection moulding on a multi-cavity mould;
    cooling the pre-form to room temperature;
ii) preparation of the final article of manufacture such as a bottle:
    transporting the pre-form to the blow moulding machine;
    re-heating the pre-form in the blow moulding machine, particularly in a reflective radiant heat oven following a pre-determined temperature profile for the pre-form;
    passing the heated pre-form through an equilibrium zone to allow the heat to disperse evenly through the pre-form wall;
    stretching the pre-form axially by a centre rod;
    orienting the stretched pre-form radially by high pressure air.

The two-machine process reveals certain advantages over single-machine process. For example, preform articles are smaller and more compact than containers. Therefore, it is easier and less costly to transport large numbers of preform articles, as compared to transporting large numbers of containers. This fact encourages producers to make preform articles in one location, and manufacture containers in a second location, reducing overall production costs. Thus, one advantage of two-machine process is that it facilitates separate optimization of each stage of manufacturing. Furthermore, it is recognized that the two-machine process is more productive and provides more opportunities for cost savings for large volume applications.

The articles prepared according to the present invention are containers and bottles that can be used in various food and non-food applications. The food applications comprise the storage of water, juices, oil, flavoured still and carbonated beverages, isotonic drinks, dry products, fresh milk, and solid food. The non-food applications comprise the storage of cosmetic and pharmaceutical products, dishwashing or washing detergents, and dry products.

Throughout the description and claims the word "comprise" and variations of the word, are not intended to exclude other technical features, additives, components, or steps. The following examples and drawings are provided by way of illustration, and they are not intended to be limiting of the present invention. Reference signs related to drawings and placed in parentheses in a claim, are solely for attempting to increase the intelligibility of the claim, and shall not be construed as limiting the scope of the claim. Furthermore, the present invention covers all possible combinations of particular and preferred embodiments described herein.

EXAMPLES

Materials

PET pellets (CR grade) were supplied from Novapet S.A. This is a standard grade for injection stretch blow moulding applications. It can be processed as sheet as well.

Purified sodium montmorillonite (Nanofil116® from BYK Additives, N116 from now on) with a moisture content from 4% to 9%. CEO of sodium montmorillonite was 116 milliequiv/100 g.

Hexadecyltrimethyl ammonium (HDTA) bromide with 99% of purity, supplied by Cymit Quimica, S.L.

Polyadipate (PA): polyester of adipic acid with 1,3-butanediol, 1,2-propanediol and 2-ethyl-1-hexanol (Glyplast 206/5NL, supplied by Condensia Quimica S.L.).

Polyphtalate (PF): poly(ethylen glycol phthalate) and diisodecyl phthalate (Glyplast 392, supplied by Condensia Quimica S.L.).

OligoPET is a polyethylene terephthalate oligomer supplied by Novapet S.A. (OPET from now on).

Ethanol supplied from Alcoholes Montplet.

Example 1. Preparation of Montmorillonite Intercalated with Polyadipate (PA) or Polyphtalate (PF)

Example 1a: Montmorillonite Intercalated with PA (N116 PA)

For the production of the montmorillonite intercalated with PA, 20 grams of purified sodium montmorillonite were dispersed in 1 L of a mixture of ethanol/water (60/40 v/v) at 70° C. under energetic stirring, particularly at a speed of 900 rpm for 120 minutes. Then, the mixture was undergone an ultrasound treatment, particularly at 20 kHz for 20 minutes and 45° C.

Then, 30 grams of PA were dissolved in 400 ml of a mixture of ethanol/water (60/40 v/v) at 70° C. After that, the phyllosilicate suspension prepared previously was added slowly for 2 hours and the solution was kept during at least 17 hours (at 70° C.) under continuous stirring at 600 rpm.

In order to remove the excess of non-intercalated PA, purification of the obtained intercalated phyllosilicate was carried out as follows. The phyllosilicate suspension was filtered under vacuum. Then, 1 L of a 40/60 vol water/ethanol freshly prepared solution was added at 60° C. to the filtrated phyllosilicate and subsequently the suspension was filtered again. The phyllosilicate was dried at 70° C. for at least 12 hours. Finally, the phyllosilicate was milled, and sieved to a particle size below 45 microns.

Example 1 b: Montmorillonite Intercalated with PF (N116 PF)

For the production of montmorillonite intercalated with PF, a similar procedure was followed but with PF. Additionally, the proportion of ethanol and water used to dissolve PF as well as for the purification step was 70/30 v/v, as PF has a lower solubility in water.

Comparative Example 1: Preparation of Montmorillonite Modified with Hexadecyltrimethyl Ammonium Cations (N116_1HDTA)

For the production of montmorillonite modified with hexadecyltrimethyl ammonium cations, 20 grams of purified sodium montmorillonite were dispersed in water at 70° C. under energetic stirring. Then, 200 ml of ethanol were added and the mixture was submitted to ultrasound treatment, particularly at 20 kHz for 20 minutes.

8.46 grams of hexadecyltrimethyl ammonium bromide were dissolved in 500 mL of ethanol at 70° C. and the phyllosilicate suspension was added slowly thereto. Then, the solution was kept under continuous stirring for at least 17 hours (at 70° C.). A cation exchange reaction between the hydrated cations (inside the montmorillonite layers) and the alkyl ammonium ions was carried out in the aqueous-ethanolic solution.

Purification of the modified phyllosilicate was carried out by filtering the dispersion under vacuum and adding to the filtrated phyllosilicate 1 L of a 50/50 vol water/ethanol fresh solution. The mixture was maintained under stirring at 70° C. for at least 1 hour. The procedure was repeated until the filtered solution had a conductivity lower than 60 µS/cm.

After filtering the suspension, the phyllosilicate was dried at 70° C. during at for at least 12 hours. Finally, the phyllosilicate was milled and sieved to a particle size below 45 microns.

The modified obtained phyllosilicate was a N116 with 1 CEO of HDTA.

Comparative Example 2: Preparation of Montmorillonite Modified with Hexadecyltrimethyl Ammonium Cations and Intercalated with PA (N116_1HDTA_PA)

20 g of N116 with 10EC of HDTA obtained in Comparative Example 1 were dispersed in 1 L of ethanol/water (60/40 v/v) under energetic stirring at 900 rpm and 50° C. for 2 hours.

Then, 22 g of PA were dissolved in 400 ml of a mixture of ethanol/water (60/40 v/v) at 45° C. Then, the previously prepared phyllosilicate suspension was added slowly under stirring for 30 minutes, and the mixture was submitted to ultrasound treatment several times until all the suspension has been added. Then, the solution was kept at 70° C. under continuous stirring for at least 17 hours. Steps of purification, grinding and sieving were carried out as in Example 1a.

Comparative Example 3: Preparation of Montmorillonite Modified with Hexadecyltrimethyl Ammonium Cations and Intercalated with PF (N116_1HDTA_PF)

The process of intercalation was the same as the process described in Comparative Example 2, but for the proportion ethanol/water used to dissolve this plasticizer in the intercalation process as well as in the purification step which was 70/30 v/v. Steps of purification, grinding and sieving were the same as in Example 1a.

Example 2. Thermal Characterization of Phyllosilicates with Intercalating Agents and/or Modifiers The presence of intercalating agents in the phyllosilicates obtained in Examples 1a and 1b was verified with thermal characterization by TGA (see Table 1) and its stability was compared with phyllosilicates obtained in Comparative Examples 1, 2 and 3.

Phyllosilicates prepared with intercalating agents (PA or PF), modifier (HDTA) and a mixture of both, showed weight changes between 200-600° C., corresponding to the range where the mentioned organic compounds are decomposed. To evaluate the thermal stability of modified and/or intercalated phyllosilicates of Examples 1a, 1b, and comparative examples 1, 2 and 3, values of the initial temperature of decomposition when 1% of the phyllosilicates is lost ($T^i_D$) were determined. These results confirm that the intercalated phyllosilicates are more stable than the phyllosilicates modified with HDTA and intercalated with either PA or PF, and even more than those modified only with HDTA. Thus, the use of PA and/or PF as intercalating agents enhances the thermal resistance of the clay compared to HDTA either alone or in combination with the intercalating agent. This is a favourable result as the processing temperature of PET is around 260° C. which allows working with the intercalated phyllosilicates without the production of degradation products derived thereof.

TABLE 1

Content of intercalating agent and modifier

| Example | Sample | % intercalating agent | % modifier | $T^i_D$ (° C.) |
|---------|--------|-----------------------|------------|----------------|
| 1a      | N116_PA | 18.0 | 0 | 264 |
| 1b      | N116_PF | 17.2 | 0 | 257 |
| Comp. 1 | N116_1HDTA | 0 | 27.9 | 218 |
| Comp. 2 | N116_1HDTA_PA | 15.1 | 27.9 | 230 |
| Comp. 3 | N116_1HDTA_PF | 22.0 | 27.9 | 227 |

In FIG. 1 the X Ray diffraction pattern of phyllosilicate (N116) with an intercalating agent (PA or PF) is shown.

Example 3. Preparation of PET-Phyllosilicate Nanocomposites

The percentage of modified and/or intercalated phyllosilicates used to produce the nanocomposite varied depending on their organic content (shown in Table 1 as intercalating agent and modifier), so that the inorganic final content is 2%.

Example 3a: PET-Montmorillonite Intercalated with PA (PET+2.44% N116_PA)

PET nanocomposites samples were obtained with the intercalated phyllosilicate prepared in Example 1a, and PET grade CR from Novapet.

For this purpose, a twin screw extruder (ZSK 26MC manufactured by Coperion GmbH) was used to prepare a mixture by adding 2 wt % of the phyllosilicate prepared in Example 1a (calculated as inorganic content, corresponding to 2.44% of N116_PA) to PET resin (CR manufactured by Novapet). The mixture was melted and kneaded at a screw rotation speed of 300 rpm, an average resin temperature of 260° C., and a resin feed rate of 10 kg/h, producing the desired resin composite material. The resin composite material obtained was extruded as a strand, quickly cooled with water, and obtained as pellets using a strand cutter. Samples were crystallized and moisture content in final composite was checked to avoid degradation in subsequent processing steps.

Round section test pieces (40 mm×0.6 mm) were injection-molded using an injection moulding machine (HM45/210, manufactured by Wittmann Battenfeld) under a mold temperature and cooling time set at 26° C. and 9 s, respectively, an average PET melt temperature of 275° C., and an overall cycle time of 20 s.

Example 3b: PET-Montmorillonite Intercalated with PF (PET+2.41 N116_PF)

The same process of Example 3a was carried out but with the intercalated phyllosilicate prepared in Example 1 b (with 2.41% of N116_PF), and PET grade CR from Novapet.

Comparative Example 4: PET-Montmorillonite with 10EC of HDTA (PET+2.78% N116_1HDTA)

The same process of Example 3a was carried out but with the modified phyllosilicate prepared in Comparative Example 1 (with 2.78% of N116_1HDTA), and PET grade CR from Novapet.

Comparative Example 5: PET-Montmorillonite with 10EC of HDTA and PA (PET+3.50% N116_1HDTA_PA)

The same process of Example 3a was carried out but with the intercalated and modified phyllosilicate prepared in Comparative Example 2 (with 3.50% N116_1HDTA_PA), and PET grade CR from Novapet.

Comparative Example 6: PET-Montmorillonite with 10EC of HDTA and PF (PET+4.10% N116_1HDTA_PF)

The same process of Example 3a was carried out but with the intercalated and modified phyllosilicate prepared in Comparative Example 3 (with 4.10% N116_1HDTA_PF), and PET grade CR from Novapet.

Example 4: Characterization of the PET-Montmorillonite Modified with HDTA Nanocomposites of Example 7

Oxygen Transmission Rate Evaluation Over Samples Prepared with PET.

Oxygen transmission rate was evaluated following standard ASTM D3985: "Standard Test Method for Oxygen Gas Transmission Rate Through Plastic Film and Sheeting Using a Coulometric Sensor". Experimental equipment was an OX-TRAN 2/20 SM. The measurements conditions were 23° C. and 0% relative humidity. The test was performed with oxygen (100%).

The results in samples prepared with PET (Table 2) show the reduction in oxygen permeability of the nanocomposites of the invention. The best improvement was observed with the nanocomposite prepared with the phyllosilicate intercalated with PA, with a reduction in oxygen permeability of almost 19%.

Results were also compared with the ones obtained from a sample prepared by admixture of PET and a high barrier polymer (particularly a polyamide grade MXD6 from Mitsubishi Gas Chemical, a crystalline polyamide produced by polycondensation of m-xylenediamine (MXDA) with adipic acid).

Improvement of the barrier properties (decrease of oxygen permeability) of the PET intercalated with PF was similar to the material of PET+MXD6, and the improvement of the barrier properties of the PET intercalated with PA was higher than the material of PET+MXD6. In any case, the use of an intercalated phyllosilicate to improve the barrier properties of PET, compared to the use of a material obtained by admixture of PET and MXD6 results in an environmental benefit, as the use of two different polymers makes difficult the recyclability of the multimaterial packaging.

TABLE 2

Oxygen permeability results at 23° C. and 0% RH over the samples prepared with PET

| SAMPLE | Permeability cc · μm/m² · day · atm | Improvement respect to neat PET (%) |
|---|---|---|
| PET | 5365.92 ± 299.16 | — |
| PET + 2.44% N116_PA | 4351.81 ± 269.92 | 18.9 |
| PET + 2.41% N116_PF | 4587.75 ± 337.99 | 14.5 |
| PET + 2% MXD6 | 4579.95 ± 217.00 | 14.6 |
| PET + 2.78% N116_1HDTA | 5162.02 ± 335.03 | 3.8 |
| PET + 3.50% N116_1HDTA_PA | 4849.11 ± 265.03 | 9.6 |
| PET + 4.10% N116_1HDTA_PF | 4889.77 ± 301.01 | 8.9 |

Mechanical Properties

Mechanical properties were evaluated using a universal testing machine (model M350-20CT), following standard ISO-527.

Results were presented in Table 3 and shows the Young's Modulus and elongation at break of PET and nanocomposites obtained in Examples 5a and 5b, and Comparative Examples 4 to 6.

As it can be observed in Table 3, Young's Modulus was increased in the case of PET nanocomposite versus pure PET, and also an increase in the elongation at break was observed in the case of nanocomposite with intercalated phyllosilicate (best result obtained with nanocomposites with PA intercalated) with respect to pure PET. This was an unexpected result since an increase in Young's Modulus generally usually implies a decrease in the elongation at break, which was observed in nanocomposites with modified phyllosilicate (PET+2.78% N116_1HDTA) and intercalated modified phyllosilicates (PET+3.50% N116_1HDTA_PA and PET+4.10% N116_1HDTA_PF).

TABLE 3

Mechanical properties of PET and nanocomposites prepared in Example 5a and 5b, and Comparative Examples 4 to 6

| Sample | Young's Modulus | s.d | Elongation at Break (mm) | s.d |
|---|---|---|---|---|
| PET | 2.31 | 0.03 | 125.89 | 5.55 |
| PET + 2.44% N116_PA | 2.40 | 0.05 | 138.35 | 3.35 |
| PET + 2.41% N116_PF | 2.38 | 0.04 | 136.12 | 2.60 |
| PET + 2.78% N116_1HDTA | 2.55 | 0.02 | 117.19 | 6.71 |
| PET + 3.50% N116_1HDTA_PA | 2.72 | 0.09 | 88.84 | 3.74 |
| PET + 4.10% N116_1HDTA_PF | 2.74 | 0.07 | 91.70 | 2.85 |

Thermal Properties

Thermal stability of the nanocomposites based on PET was determined by TGA. Values of initial temperature of decomposition when 1% of the nanocomposites is lost ($T^i_D$) and the temperature at the maximum degradation rate were extracted from their thermogravimetric curves to compare the stability. Results are shown in Table 4. It is observed that when intercalated clays are used $T^i_D$ is almost maintained, while the use of clays modified with HDTA leads to nanocomposites with a $T^i_D$ 15° C. or even 30° C. lower. A similar effect is observed with the $T_{max}$. degradation rate.

TABLE 4

Parameters of thermal stability of nanocomposites based on PET

| Sample | $T^i_D$ (° C.) | $T_{max}$. degradation rate (° C.) |
|---|---|---|
| PET | 393 | 454 |
| PET + 2.44% N116_PA | 387 | 457 |
| PET + 2.41% N116_PF | 389 | 455 |
| PET + 2.78% N116_1HDTA | 378 | 450 |
| PET + 3.50% N116_1HDTA_PA | 362 | 451 |
| PET + 4.10% N116_1HDTA_PF | 260 | 448 |

From these results it is possible to conclude that nanocomposites with phyllosilicates intercalated with both agents (PA and PF) have a higher stability than with modified phyllosilicates or with modified and intercalated phyllosilicates.

Example 5: Preparation of Beverage Bottles Composed of PET-Phyllosilicate Dispersed in PA or PF Example 5a: Preparation of Beverage Bottles Composed of PET-Phyllosilicate Dispersed in PA N116 was dispersed in a polyadipate matrix at a weight ratio of 57:43 by means of a heated reactor and an agitator at 40° C.

A high intrinsic viscosity PET resin (MW SOFT BB1200 from Novapet) was used as raw material. The PET resin was previously dried to prevent degradation. All materials were previously conditioned and the liquid dispersion of N116 in polyadipate was heated up to 80° C. to decrease viscosity and facilitate the flowability.

Processing was based on a two-step process, injection-stretch-blow-moulding (ISBM). An injection moulding machine having 48 cavities with an estimated weight of 48 g/preform was used. Temperature was set to 270° C. A dosing system was coupled with the injection moulding machine to provide the required quantity of 4.6 and 9.2 grams per shot. Two reinforced PETs with a final amount of montmorillonite of 0.2 and 0.4% w/w, respectively, were obtained by dispersing 570 g of N116 in 430 g of polyadipate. Then, 3, 5 and 7 gr of the dispersion per 1 kg of PET were added to the pellets to obtain a final content of phyllosilicate of 0.2 and 0.4%, respectively. Preform heating was adjusted and was lower than conventional PET, final oven temperature was around 75° C. Preforms were blown and the obtained 1.5 L volume bottles were subjected to characterization (see data in Example 16 below).

Example 5b: Preparation of Beverage Bottles Composed of PET-Phyllosilicate Dispersed in PF Small scale trials were performed using a two stage technique. Previous to the injection moulding step, a dispersion of N116 (570 g) in polyphtalate (430 g) was applied onto pellets of PET (CR grade from Novapet) as alternative to liquid feeding directly on the hopper in an amount of 0.035 g of dispersion for each g of PET pellets. The processing temperature for the preform injection moulding was set to 270° C. Preforms with a weight of 22.5 g were obtained. Then, the preforms were subjected to reheating, with a final temperature of about 95° C., and were blown to obtain 0.5 L bottles. Final weight of clay on the PET was 2% w/w.

Example 6: Characterization of Beverage Bottles Described in Example 5

Water Vapour Transmission Rate (WVTR)

Water weight loss from the bottles of Example 5a was evaluated by filling five samples of each bottle (5 bottles of PET+0.2% N116_Dispersed in PA and 5 bottles of PET+0.4% N116_Dispersed in PA) with 1.5 L of water and closing the bottles with caps. Two unfilled bottles (one of each type) and closed with the same caps were used as control. Results were compared with non-reinforced PET bottles. The test was carried out at 23° C. and 50% HR following the method disclosed in PBI 5-1968 (Rev. 2-1990; The Plastic Bottle Institute. "Methods of test for weight change and compatibility of packed products".).

Results are shown in Table 5. It can be seen that the smaller the value of the water vapour permeability, the more excellent the barrier property. The maximum reduction in WVTR at these conditions was reached with the PET reinforced with 0.4% of the phyllosilicate dispersed in PA.

TABLE 5

Water weight loss of the bottles described in Example 5a.

| SAMPLE | Water weight loss (%/day) | Improvement respect to neat PET (%) |
|---|---|---|
| PET | 0.00341 | — |
| PET + 0.2% N116_Dispersed in PA | 0.00270 | 21.0 |
| PET + 0.4% N116_Dispersed in PA | 0.00243 | 29.0 |

Oxygen Transmission Rate (OTR)

Oxygen transmission rate of the bottles from Example 5b was determined following the standard ASTM D3985: "Standard Test Method for Oxygen Gas Transmission Rate Through Plastic Sheet and Sheeting Using a Coulometric Sensor" in a OXTRAN Model 2/21". The maximum reduction in OTR at these conditions was reached with 2% of the phyllosilicate dispersed in PF, as can be seen in Table 6.

TABLE 6

Oxygen transmission rate of the bottles described in Example 5b.

| SAMPLE | Oxygen transmission rate (cc/bottle · day) | Improvement respect to neat PET (%) |
|---|---|---|
| PET | 0.269790 ± 0.009467 | — |
| PET + 2% N116_Dispersed in PF | 0.218801 ± 0.007636 | 18.9 |

Comparative Example 7: Preparation of Montmorillonite Intercalated with OligoPET (N116_OPET)

For the production of the montmorillonite intercalated with OligoPET, 400 grams of OligoPET, and 100 grams of refined N116 were extruded at 60° C. and 100 rpm. A Brabender extruder, Plastograph ID 815606 was used for this preparation.

Comparative Example 8: PET-Montmorillonite with OligoPET (PET+10% N116_OPET)

The same process of Example 3a was carried out but with the intercalated phyllosilicate prepared in Comparative Example 7 (with 10% N116_OPET).

Example 7: Characterization of PET-Intercalated Montmorillonites

Mechanical Properties

Mechanical properties were evaluated using a universal testing machine (model M350-20CT), following standard ISO-527.

Result of elongation at break when OPET is used is dramatically reduced, making this material highly brittle.

| Sample | Young's Modulus (GPa) | s.d | Elongation at break (mm) | s.d |
|---|---|---|---|---|
| PET | 2.31 | 0.03 | 125.89 | 5.55 |
| PET + 2.44% N116_PA | 2.40 | 0.05 | 138.35 | 3.35 |
| PET + 10% N116_OPET | 2.58 | 0.03 | 1.28 | 0.20 |

Thus, mechanical properties of PET with montmorillonite intercalated with OPET are drastically deteriorated, what makes the nanocomposite material unable for their use in the manufacture of bottles.

Thermal Properties

Thermal properties of PET nanocomposites were determined by using differential scanning calorimetric analysis (DSC). DSC analysis determine main thermal transitions of the polymer: glass transition temperature (Tg), cold crystallization (Tcc) and melting temperatures (Tm), and the enthalpies associated to each thermal transition.

The method used is based on one step that consists on one first heating ramp at 10° C./min, from 20° C. to 350° C. under nitrogen atmosphere. Results from this test represent sample's thermal history.

| Sample | Tg (° C.) | Tcc (° C.) | ΔHcc (J/g) | Tm (° C.) | ΔHm (J/g) |
|---|---|---|---|---|---|
| PET | 70 | 123 | 25.11 | 246 | 42.54 |
| PET + 10% (N116_OPET) | 66 | 114 | 27.83 | 246 | 48.03 |

Lower Tg and Tcc values of PET nanocomposite with N116_OPET compared to those of PET, indicate unfavourable results. In the case of Tg, the difference between both values is quite significant, making the nanocomposite material to achieve a softening state at lower temperatures than pure PET.

In the case of Tcc, lower values of this thermal transition could make the material more crystalline once they are going to be submitted to thermal processes to perform the final packaging. For example, in the case of blowing bottles, if the blowing temperature is close to this value, the final packaging will crystallize, worsening their final properties.

REFERENCES CITED IN THE APPLICATION

1. EP1787918
2. CN1465621
3. WO2012017026
4. PBI 5-1968 (Rev. 2-1990; The Plastic Bottle Institute. "Methods of test for weight change and compatibility of packed products"
5. ASTM D3985: "Standard Test Method for Oxygen Gas Transmission Rate Through Plastic Sheet and Sheeting Using a Coulometric Sensor" in a OXTRAN Model 2/21

The invention claimed is:

1. An intercalated phyllosilicate having a structure of layers and comprising an intercalating agent between the layers, wherein the intercalating agent is a polyester of a molecular weight of 274 to 30,000 g/mol selected from polyadipate, polyphthalate, and a mixture thereof, and wherein the phyllosilicate is other than a phyllosilicate modified through ionic interchange.

2. The intercalated phyllosilicate according to claim 1, wherein the weight ratio of intercalating agent to phyllosilicate is 5:95 to 60:40.

3. The intercalated phyllosilicate according to claim 1, wherein the polyester is polyadipate.

4. The intercalated phyllosilicate according to claim 1, wherein the polyester has a molecular weight of 1,000 to 5,000 g/mol.

5. The intercalated phyllosilicate according to claim 1, wherein the phyllosilicate is selected from the group consisting of a montmorillonite, sepiolite, halloysite, bentonite, kaolinite, wollastonite, and mica.

6. The intercalated phyllosilicate according to claim 1, wherein the phyllosilicate is selected from the group consisting of sodium montmorillonite, magnesium montmorillonite, and calcium montmorillonite.

7. The intercalated phyllosilicate according to claim 6, wherein the phyllosilicate is sodium montmorillonite.

8. A polymer nanocomposite comprising:
a polyethylene terephthalate (PET) polymer; and
an intercalated phyllosilicate as defined in claim 1.

9. The polymer nanocomposite according to claim 8, wherein the weight-to-weight ratio of intercalated phyllosilicate to PET polymer is from 0.2:99.8 to 20:80.

10. A process for the preparation of the intercalated phyllosilicate as defined in claim 1 comprising:
i) dispersing a phyllosillicate which is other than a phyllosilicate modified through ionic interchange in a solvent selected from water and a mixture of water and a $C_1$-$C_{10}$ alcohol under stirring;
ii) optionally, submitting the dispersion to ultrasonic treatment;
iii) mixing the dispersion with an intercalating agent selected from polyadipate, polyphthalate, and a mixture thereof, optionally in a mixture of water and a $C_1$-$C_{10}$ alcohol;
iv) keeping the mixture of step iii) under continuous stirring for 17 to 24 hours at a temperature from 60° C. to 75° C.; and
v) isolating the compound obtained in step (iv).

11. A process for the preparation of a PET nanocomposite, the process comprising melt-blending a PET polymer and the intercalated phyllosillicate as defined in claim 1.

12. A method for reinforcing a polyethylene terephthalate (PET) polymer comprising incorporating into the PET polymer an intercalated phyllosilicate as defined in claim 1.

13. An article of manufacture made of the polymer nanocomposite as defined in claim 8.

14. A process for the preparation of an article of manufacture made of the polymer nanocomposite as defined in claim 8, the process comprising:
a) dispersing a phyllosilicate which is other than a phyllosilicate modified through ionic interchange in an intercalating agent;
b) mixing the dispersion obtained in step a) with the PET polymer; and
c) obtaining an article of manufacture by extrusion, injection or injection stretch blow moulding of the mixture obtained in step b);
wherein the intercalating agent is a polyester of a molecular weight of 274 to 30,000 g/mol, and wherein the phyllosilicate is not modified through ionic interchange.

15. The intercalated phyllosilicate according to claim 2, wherein the polyester is polyadipate.

16. The intercalated phyllosilicate according to claim 15, wherein the polyester has a molecular weight of 1,000 to 5,000 g/mol.

17. The intercalated phyllosilicate according to 16, wherein the phyllosilicate is selected from the group consisting of sodium montmorillonite, magnesium montmorillonite, and calcium montmorillonite.

18. A polymer nanocomposite comprising:
a polyethylene terephthalate (PET) polymer; and
an intercalated phyllosilicate as defined in claim 17.

19. The polymer nanocomposite according to claim 18, wherein the weight-to-weight ratio of the intercalated phyllosilicate to PET polymer is from 0.2:99.8 to 20:80.

20. An article of manufacture made of the polymer nanocomposite as defined in claim 19.

* * * * *